United States Patent
Bader et al.

(10) Patent No.: US 8,484,977 B2
(45) Date of Patent: Jul. 16, 2013

(54) REGULATING THE FLOW RATE OF FUEL TAKEN FROM A FUEL CIRCUIT OF AN AIRCRAFT PROPELLED BY AN ENGINE

(75) Inventors: Nicolas Alain Bader, Vaux le Penil (FR); Rachid Boudyaf, Alfortville (FR); Alexis Patouillard, Montgeron (FR)

(73) Assignee: SNECMA, Paris (FR)

( * ) Notice: Subject to any disclaimer, the term of this patent is extended or adjusted under 35 U.S.C. 154(b) by 1042 days.

(21) Appl. No.: 12/499,391

(22) Filed: Jul. 8, 2009

(65) Prior Publication Data
US 2010/0018182 A1 Jan. 28, 2010

(30) Foreign Application Priority Data
Jul. 25, 2008 (FR) .................................. 08 55113

(51) Int. Cl.
*F02C 9/00* (2006.01)
(52) U.S. Cl.
USPC ........................................ 60/734; 60/39.281
(58) Field of Classification Search
USPC ............... 60/39.281, 240, 243, 790, 800, 734
See application file for complete search history.

(56) References Cited

U.S. PATENT DOCUMENTS

| | | | |
|---|---|---|---|
| 2,669,093 A | 2/1954 | Lee, II et al. | |
| 2,743,594 A * | 5/1956 | Hill et al. | 464/24 |
| 3,985,468 A | 10/1976 | Lewis | |
| 4,004,412 A | 1/1977 | Burnell | |
| 4,200,072 A * | 4/1980 | Bailey | 123/450 |
| 4,530,331 A * | 7/1985 | Gibson et al. | 123/450 |
| 5,184,458 A | 2/1993 | Lampe et al. | |
| 7,028,461 B2 * | 4/2006 | Goi | 60/39.22 |
| 2005/0103931 A1 | 5/2005 | Morris et al. | |

FOREIGN PATENT DOCUMENTS

EP 1 359 299 A1 11/2003
WO WO 03/044328 A1 5/2003

* cited by examiner

*Primary Examiner* — Phutthiwat Wongwian
*Assistant Examiner* — Nicholas Vaccaro
(74) *Attorney, Agent, or Firm* — Oblon, Spivak, McClelland, Maier & Neustadt, L.L.P.

(57) ABSTRACT

The invention relates to a device for regulating the flow rate of fuel taken from a fuel circuit of an aircraft propelled by an engine. The device comprises: a positive displacement pump receiving fuel from a fuel circuit of the aircraft and delivering fuel at a flow rate that is proportional to its speed of rotation; a differential gear having a predefined transmission ratio, a first inlet mechanically coupled to the aircraft engine, a second inlet mechanically coupled to an electric motor/generator, and an outlet mechanically coupled to the positive displacement pump to drive it in rotation; and an electronic control system for regulating the speed of rotation of the electric motor/generator as a function of a setpoint value for the flow rate of fuel to be injected.

14 Claims, 3 Drawing Sheets

REGULATING THE FLOW RATE OF FUEL TAKEN FROM A FUEL CIRCUIT OF AN AIRCRAFT PROPELLED BY AN ENGINE

BACKGROUND OF THE INVENTION

The invention relates to a device for regulating the rate at which fuel is taken from a fuel circuit of an aircraft propelled by an engine, and particularly but not exclusively by a gas turbine engine.

It is common practice for fuel to be fed to a gas turbine airplane engine via a positive displacement pump (e.g. a gear pump). The pump receives fuel from a fuel circuit of the airplane and delivers a flow of fuel in particular for feeding the combustion chamber of the engine.

A positive displacement gear pump presents the particular feature of delivering fuel at a rate that is proportional to its speed of rotation. Since the pump of an airplane engine is generally driven by the accessory gearbox (AGB) that is coupled to a shaft of the engine (e.g. the high pressure shaft in a two-spool turbomachine), the rate at which it delivers fuel to the combustion chamber is mechanically proportional to the speed of rotation of the engine.

Unfortunately, the requirement of the combustion chamber of the engine for fuel injection is not linear relative to the speed of rotation of the engine. In addition, given its particular manner of operation, a positive displacement gear pump needs to be dimensioned so as to be capable of delivering a quantity of fuel that is sufficient for ensuring that the combustion chamber of the engine operates during any stage of flight, and in particular during takeoff or when relighting the engine. As a result, during most stages of flight of an airplane, the quantity of fuel that is taken by the pump is greater than the quantity needed to ensure operation of the combustion chamber, so the fuel that is not used needs to be returned to the fuel circuit by a recirculation loop.

In addition to the complexity of providing circuits for returning the unused fuel to the fuel circuit, such as solution for feeding the engine with fuel presents the drawback of drawing mechanical energy from the engine shaft driving the pump that is greater than real requirements, with this surplus mechanical energy not being available for driving other equipment in the engine or the airplane. In addition, the presence of a recirculation loop has the drawback of heating the fuel and thus contributing in negative manner to the thermal behavior of the system.

The use of a variable-geometry pump (i.e. a pump having a rate that can be regulated under hydraulic control) enables the above problems to be solved in part. Nevertheless, such a pump is complex to make and is subject to numerous mechanical breakdowns that make it unreliable. In addition, with a variable-geometry pump, there is no way of installing control redundancy in order to mitigate a potential breakdown thereof.

The use of a positive displacement pump that is driven solely by an electric motor has also been envisaged (reference can be made to publication U.S. Pat. No. 4,815,278, for example). Such a solution enables the quantity of fuel taken by the pump to be matched accurately to the fuel requirements of the combustion chamber during all stages of flight of the airplane. Nevertheless, driving a pump by means of an electric motor requires a high power electric motor to be used (by way of example, a motor having power of about 50 kilowatts (kW) for a turbomachine gear pump), with all the drawbacks that that involves in terms of electrical architecture (presence of bulky inverters, etc.).

OBJECT AND SUMMARY OF THE INVENTION

A main object of the present invention is to thus to propose regulating the rate at which fuel is taken from a fuel circuit by using an electric motor to provide control and by optimizing the rate at which mechanical power is drawn so as to mitigate the drawbacks of the above-mentioned solutions.

This object is achieved by a device for regulating the flow rate at which fuel is taken from a fuel circuit of an aircraft propelled by an engine, the device comprising: a positive displacement pump receiving fuel from a fuel circuit of the aircraft and delivering fuel at a flow rate that is proportional to its speed of rotation; a differential gear having a predefined transmission ratio, a first inlet mechanically coupled to the aircraft engine, a second inlet mechanically coupled to an electric motor/generator, and an outlet mechanically coupled to the positive displacement pump to drive it in rotation; and an electronic control system for regulating the speed of rotation of the electric motor/generator as a function of a setpoint value for the flow rate of fuel to be injected.

By regulating the speed of rotation of the positive displacement pump by means of the differential gear, it is possible to limit circumstances in which there is a need for fuel that has been taken and not used to be returned to the fuel circuit. Depending on the transmission ratio selected for the differential gear and depending on the operating speed of the engine associated with the setpoint for the flow rate of fuel to be injected, the electronic control system adapts the speed of rotation of the electric motor/generator so that the positive displacement pump is driven at the speed of rotation that is appropriate for taking the desired quantity of fuel.

With the regulator device of the invention, the rate at which fuel is taken from the fuel circuit of the aircraft is thus regulated in a manner that is less dependent on the speed of rotation of the engine. The mechanical energy takeoff from the engine for driving the pump is thus optimized. This produces better optimization of the dimensioning of the pump and of the heat exchangers (in terms of cylinder capacity and thermally).

Furthermore, the regulator device of the invention presents the particular feature that the electric motor/generator can behave either as a motor transforming electrical energy received from the electrical circuit into mechanical energy for driving the pump in a manner that is compatible with the fuel requirements of the aircraft engine, or else as a generator that transforms a fraction of the mechanical energy received by the motor via the differential into electrical energy that is conveyed to the electric circuit, thereby regulating the speed of the pump so that it delivers the desired flow rate of fuel. During certain operating conditions of the engine, generating electrical energy is of use for powering other pieces of equipment of the aircraft or of the engine.

Compared with a variable-geometry pump, the regulator device of the invention presents the advantage of being simpler in design and of presenting better reliability. Compared with a pump that is driven exclusively electrically, the regulator device of the invention enables lower-power electronics to be installed and simplifies architecture, occupying less space and presenting less weight.

In an embodiment, the electronic control system includes means for calculating a setpoint value for the speed of rotation of the electric motor/generator from: the setpoint value for the flow rate of fuel to be injected; a real speed of rotation of the aircraft engine; a real speed of rotation of the electric motor/generator; and the transmission ratio of the differential gear.

For this purpose, the electronic control system is advantageously connected to a device for measuring the speed of rotation of the aircraft engine, and to a device for measuring the speed of rotation of the electric motor/generator.

Preferably, the setpoint value for the speed of rotation of the electric motor/generator is also calculated from a real flow rate of fuel delivered at the outlet from the positive displacement pump. For this purpose, the electronic control system is advantageously connected to a device for measuring the flow rate of fuel delivered at the outlet from the positive displacement pump.

Also preferably, the setpoint value for the flow rate of fuel for injection is established on the basis of operating parameters of the aircraft and of the engine that propels it.

The device may further include a centrifugal pump having a low-pressure inlet receiving the fuel from the aircraft fuel circuit and a high-pressure outlet connected to the inlet of the positive displacement pump. Under such circumstances, the centrifugal pump may be driven by mechanical coupling to the positive displacement pump or by direct mechanical coupling to the aircraft engine.

Also preferably, the first inlet of the epicyclic gear train is mechanically coupled to an accessory gearbox of the aircraft engine.

The electric motor/generator may be connected to at least one electric circuit of the aircraft via at least one electric inverter.

The electronic control system may be an electronic module of a full authority digital engine control system of the aircraft engine.

Also preferably, the differential gear is an epicyclic gear train having a sun gear that constitutes the first inlet of the differential gear, an outer ring gear that constitutes the second inlet of the differential gear, and a planet carrier that constitutes the outlet of the differential gear.

BRIEF DESCRIPTION OF THE DRAWINGS

Other characteristics and advantages of the present invention appear from the description given below with reference to the accompanying drawings that show an embodiment having no limiting character. In the figures.

DETAILED DESCRIPTION OF AN EMBODIMENT

Figure 1:
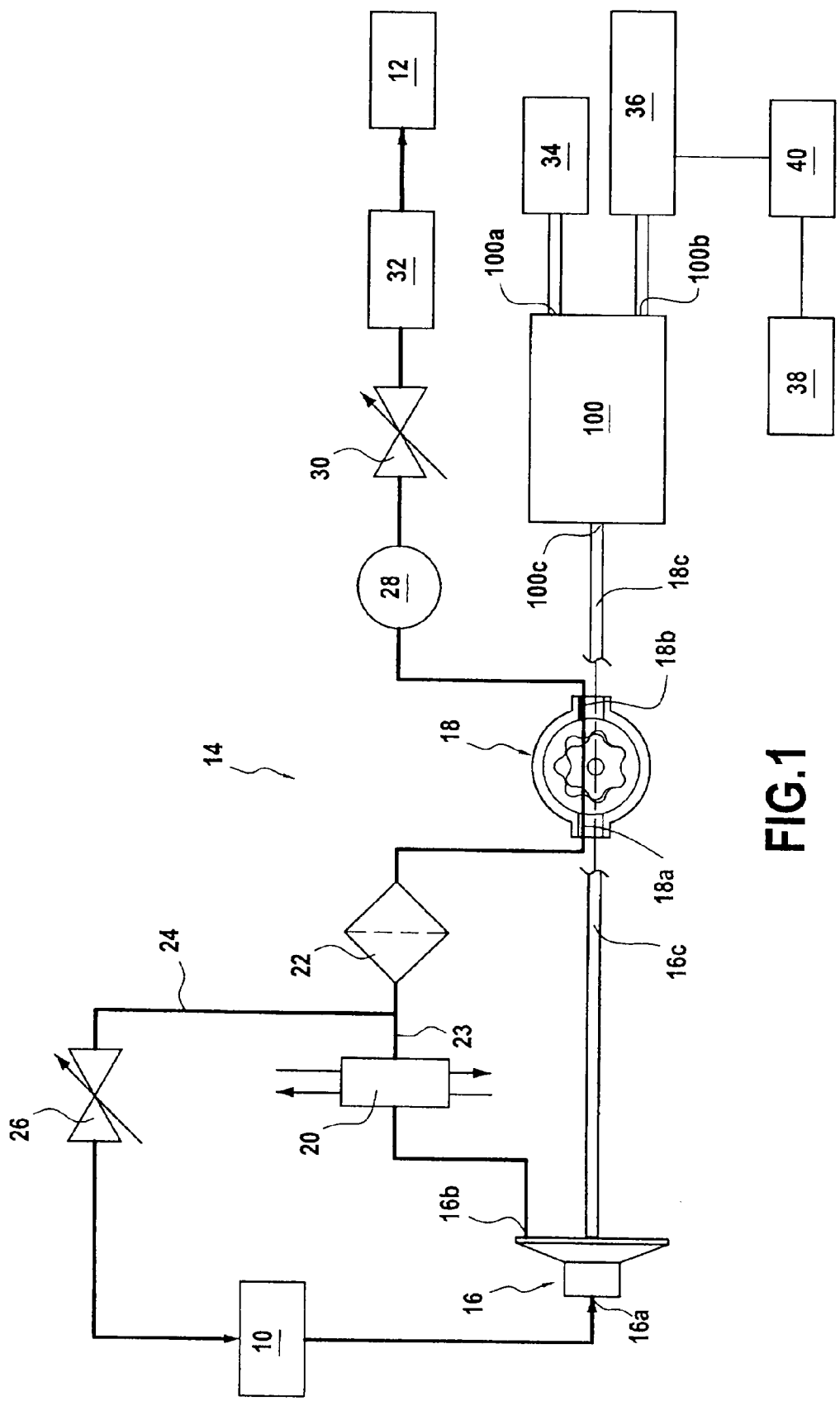
FIG. 1 shows an embodiment of a device in accordance with the invention for regulating the flow rate of fuel.

FIG. 1 show part of a fuel supply circuit for a gas turbine airplane engine. Naturally, the invention applies to aeroengines other than gas turbine airplane engines, e.g. to helicopter engines.

The supply circuit serves to convey fuel taken from a fuel circuit 10 to a combustion chamber 12 of the gas turbine engine. The quantity of fuel taken from the fuel circuit 10 is determined by a regulator device 14 in accordance with the invention.

The regulator device 14 comprises both a centrifugal pump 16 constituting an inlet pump of the circuit and a positive displacement pump 18, e.g. a gear pump. The centrifugal pump 16 has a low-pressure inlet 16a connected to the fuel circuit 10 and a high-pressure outlet 16b delivering fuel at a pressure that is a function of the speed of rotation of the pump. The gear pump 18 has an inlet 18a connected to the outlet 16b of the centrifugal pump, and it also has an outlet 18b.

The fuel pipe 23 between the centrifugal pump 16 and the gear pump 18 may include a particle filter 22 and a heat exchanger circuit 20 for exchanging heat between the fuel and oil for lubricating components of the engine. Furthermore, a recirculation loop 24 having a valve 26 may be inserted between the heat exchanger circuit 20 and the particle filter 22 so as to redirect fuel under certain starting conditions to the fuel circuit 10.

At the outlet 18b from the gear pump 18, the fuel can pass in succession through a regulation flow meter 28 (replaceable by a system using a metering unit and measuring pressure difference), a cutoff and pressurizing valve 30, and a mass flow meter 32, prior to reaching the combustion chamber 12 of the engine.

Furthermore, a fuel takeoff (not shown in FIG. 1) could be inserted between the outlet 18b of the gear pump 18 and the regulation flow meter 28 in order to take off fuel for controlling variable geometry components of the engine.

The gear pump 18 is driven in rotation by its rotary shaft 18c being coupled mechanically to a differential gear 100.

The differential gear 100 is an epicyclic gear train constituted by a plurality of gearwheels. It possesses a first inlet 100a mechanically coupled to the accessory gearbox 34 of the engine, a second inlet 100b mechanically coupled to an electric motor/generator 36, and an outlet 100c mechanically coupled to the rotary shaft 18c of the gear pump 18 in order to drive it in rotation.

In known manner, the gearbox 34, commonly referred to by the abbreviation AGB for "accessory gearbox", serves to drive various accessories of the engine or its auxiliary equipment. This gearbox is itself driven in rotation by taking some of the mechanical energy produced by a rotary shaft of the engine (such as the high-pressure shaft in a two-spool turbomachine, for example). The speed of rotation of the gearbox 34 is thus proportional to the speed of operation of the engine.

The electric motor/generator 36 is connected to at least one electric circuit 38 of the airplane via at least one inverter 40. The motor/generator used is a reversible electric machine capable of operating as a motor or as a generator. In motor operation, the motor/generator 36 transforms the electrical energy it receives from the electric circuit 38 into mechanical energy that is transmitted to the second inlet 100b of the differential 100, and in generator operation it transforms a fraction of the mechanical energy it receives via the second inlet of the differential into electrical energy that is transmitted to the electric circuit 38 via the inverter 40.

Figure 2:
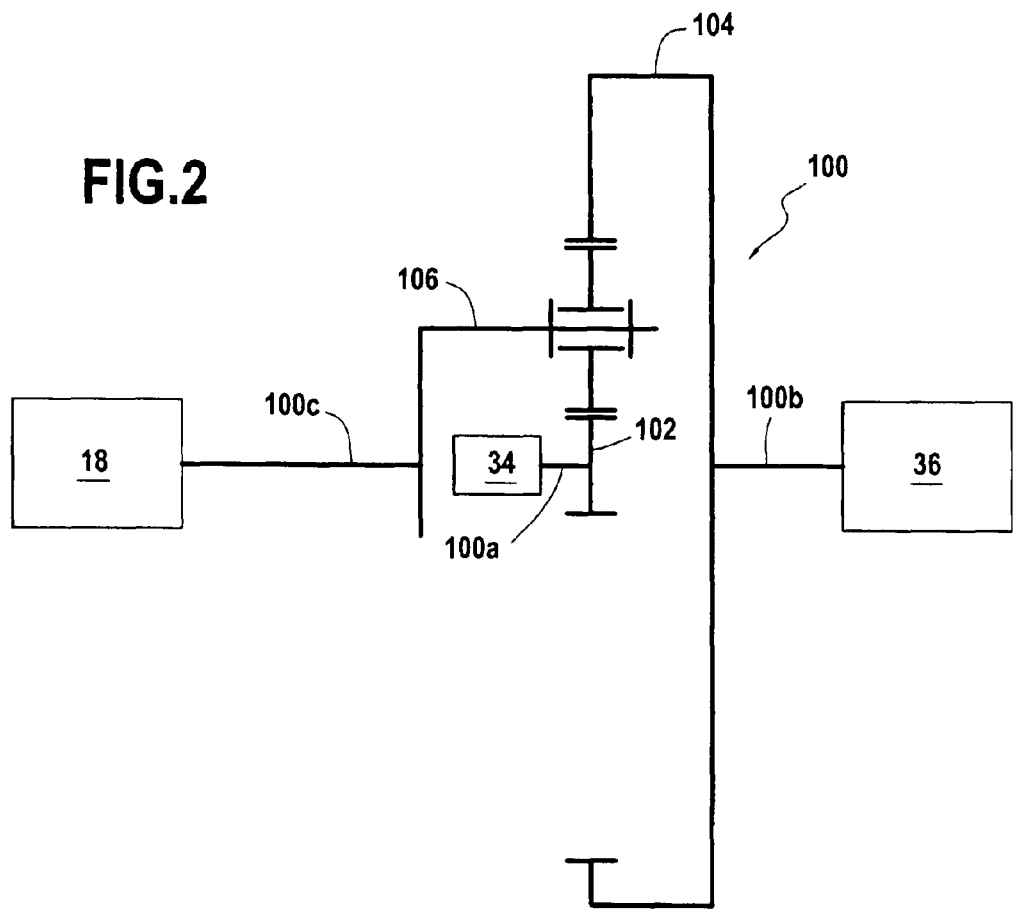
FIG. 2 shows a drive train of a differential gear suitable for use in the FIG. 1 device.

An example of a drive train for the differential gear 100 used for driving the gear pump 18 in rotation is shown in FIG. 2. Other differential gears could naturally be used.

In FIG. 1, the differential 100 comprises a sun (or central) gear 102 constituting the first inlet 100a of the differential that is connected to the AGB 34, an outer ring gear 104 (or annulus) constituting the second inlet 100b of the differential that is connected to the electric motor/generator 36, and a planet carrier 106 constituting the outlet 100c of the differential that is connected to the gear pump 18.

In known manner, the differential gear 100 possesses a transmission ratio R that is predefined and that is a function of the number of teeth of the various gearwheels constituting it. This transmission ratio R is known at the time the differential 100 is designed. It makes it possible to establish the following equation of proportionality between the speed of rotation $N_{pump}$ of the rotary shaft 18c of the gear pump 18 (coupled to the outlet 100c of the differential) and the respective speeds of rotation $N_{AGB}$ and $N_E$ of the AGB 34 and of the rotor of the electric motor/generator 36 (coupled respectively to the first inlet 100a and to the second inlet 100b of the differential):

$$R = \frac{N_E - N_{pump}}{N_{AGB} - N_{pump}}$$

Since the speed $N_{AGB}$ and the transmission ratio R of the differential are known, it is possible, by acting on the speed of rotation $N_E$ of the rotor of the electric motor/generator, to regulate the speed $N_{pump}$ of the rotary shaft 18c of the gear pump 18 so as to regulate the flow rate of fuel taken thereby (this flow rate of fuel taken by the pump 18 is proportional to its speed of rotation).

For this purpose, the regulator device 14 also includes an electronic control system 42 (FIG. 3) that enables the speed of rotation $N_E$ of the electric motor/generator 36 to be regulated as a function of requirements in terms of fuel takeoff by the gear pump 18.

For example, the electronic control system 42 may be an electronic module of the full authority digital engine control (FADEC) system.

Figure 3:
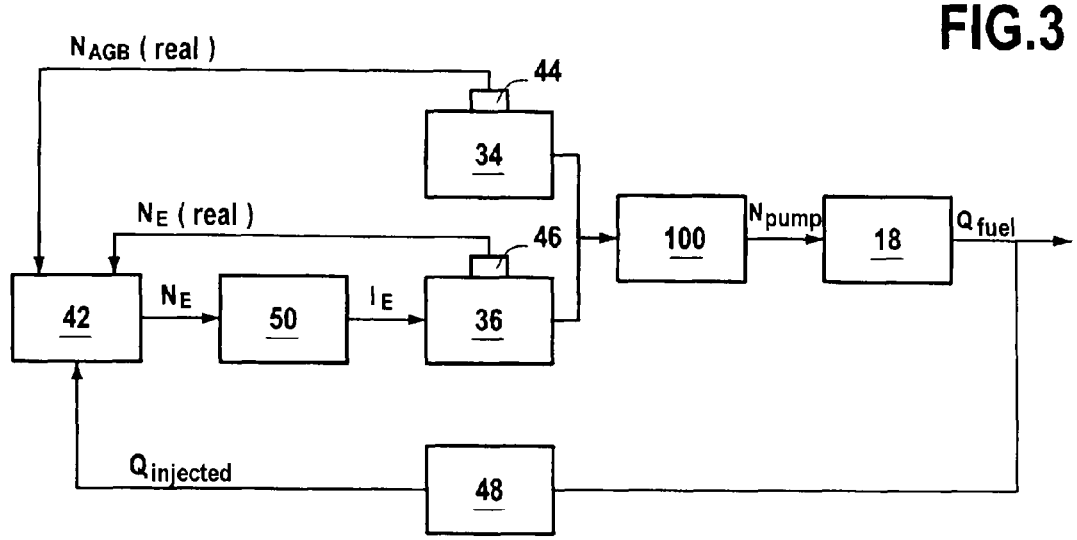
FIG. 3 is a block diagram showing the control system used by the FIG. 1 regulator device.

As shown in FIG. 3, the regulator device thus comprises devices 44 and 46 for measuring the real speed of rotation $N_{AGB(real)}$ of the AGB 34 (which is proportional to the operating speed of the engine), and the real speed of rotation $N_{E(real)}$ of the electric motor/generator 36.

The regulator device preferably further includes a device 48 for measuring the flow rate $Q_{injected}$ of fuel delivered at the outlet of the gear pump 18. For example, this measuring device may be a mass or volume flow meter. It may also be constituted by the regulation flow meter 28 described with reference to FIG. 1.

Furthermore, it may be observed that in the embodiment of FIG. 1, the centrifugal pump 16 is driven in rotation by its rotary shaft 16c being mechanically coupled to the gear pump 18. Alternatively, the rotary shaft of the centrifugal pump could be coupled mechanically directly to the AGB 34 in order to be driven directly thereby.

The operation of the regulator device of the invention is as follows. The electronic control system 42 generates a setpoint value that is representative of the desired flow rate of fuel for injection into the combustion chamber. This setpoint value is established from operating parameters of the airplane and of the engine, as described below.

The electronic system 42 receives a signal $Q_{injected}$ delivered by the flow meter 48 and representative of the real flow rate of fuel at the outlet from the gear pump 18. As a function of the difference detected between the setpoint value and the real flow rate of the fuel, the electronic system establishes a corrective value for the fuel flow rate $Q_{fuel}$ for regulating the pump takeoff rate to the desired rate.

Since the rate at which fuel is taken by the gear pump 18 is proportional to its speed of rotation, the corrective value for fuel flow rate $Q_{fuel}$ as calculated above is transformed into a setpoint value for the speed of rotation $N_{pump}$ of the gear pump.

In parallel, the electronic system 42 receives signals delivered by the measuring devices 44 and 46, which signals are representative of the real speed of rotation $N_{AGB(real)}$ of the AGB 34 and the real speed of rotation $N_{E(real)}$ of the electric motor/generator 36.

From the values $N_{pump}$, $N_{AGB(real)}$, and from the predefined transmission ratio R of the differential 100, the electronic system 42 then establishes a setpoint value for the speed of rotation of the electric motor/generator 36. As a function of the difference detected between said setpoint value and the real speed of rotation $N_{E(real)}$ of the motor/generator, the electronic system establishes a corrective value for the speed of rotation $N_E$ for application to the motor/generator.

The corrective value $N_E$ is then converted by a device 50 for controlling the assembly comprising the inverter and the motor/generator into a current command $I_E$ for application to the electric motor/generator 36 so as to regulate the rate at which the pump takes fuel to the desired rate.

As mentioned above, the setpoint value representative of the rate at which it is desired to inject fuel is established from operating parameters of the airplane and of the engine.

Figure 4:
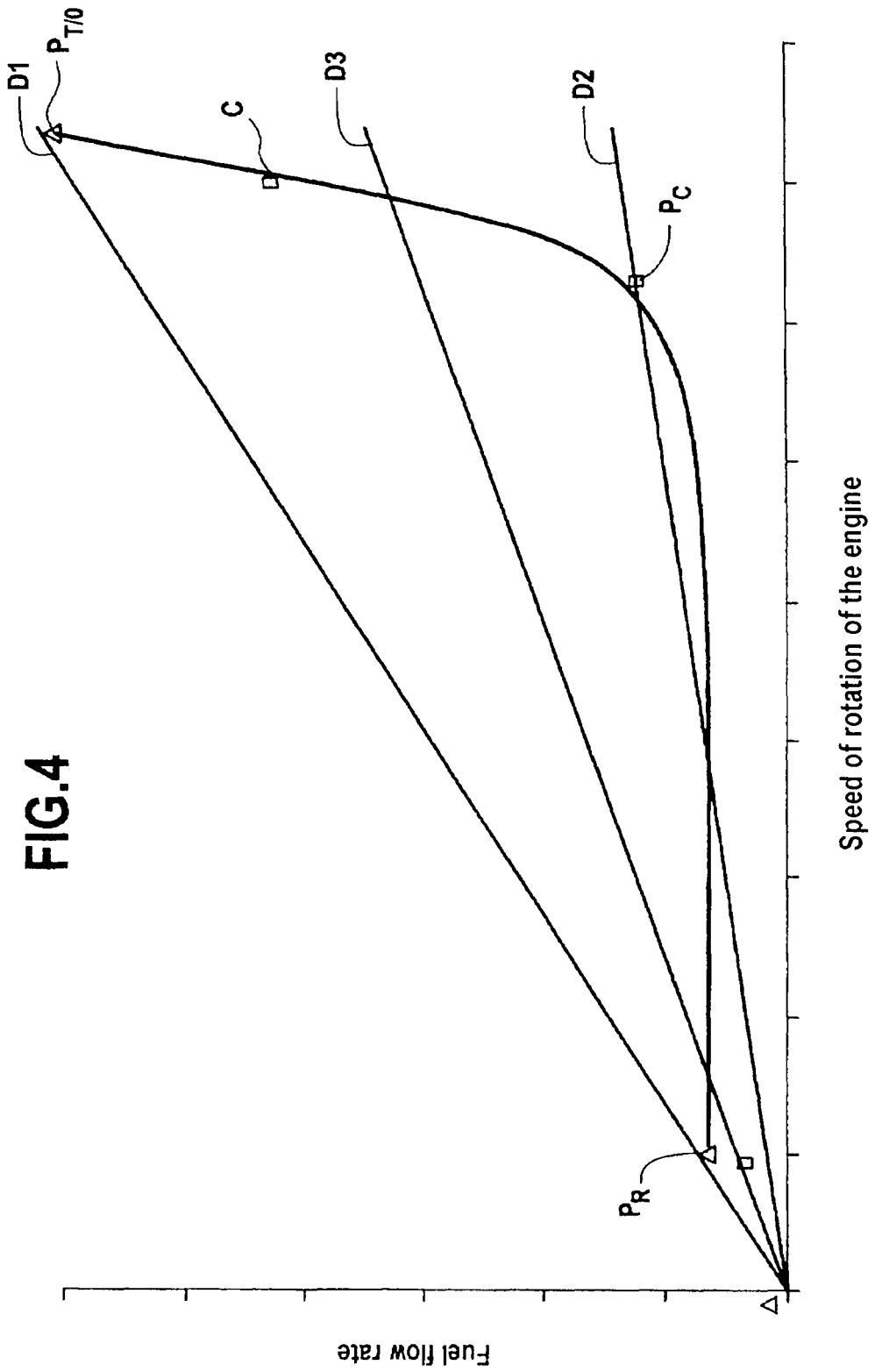
FIG. 4 plots curves representing flow rates of injected fuel as a function of the operating speed of an aviation turbomachine.

This setpoint value is established in particular from a curve such as the curve C shown in FIG. 4. This curve C shows the fuel flow rate needed for feeding the combustion chamber of the engine as a function of its speed of rotation.

The curve C presents three remarkable points, namely: the point $P_{T/O}$ corresponding to the fuel flow rate required for airplane takeoff; the point $P_R$ corresponding to the fuel flow rate required for relighting the combustion chamber of the engine; and the point $P_C$ corresponding to the fuel flow rate while the airplane is in a cruising flight stage. The fuel flow rates between the points $P_{T/O}$ and $P_C$ correspond to stages during which the airplane is climbing.

The straight lines $D_1$, $D_2$, and $D_3$ also shown in FIG. 4 give three examples of different rates (as a function of engine speed of rotation) at which fuel is taken from the fuel circuit of the airplane in different variants of the regulator device of the invention (when the corrective value $N_E$ is equal to zero). These fuel flow rates correspond to different values taken by the transmission ratio R of the differential gear of the regulator device of the invention.

In the example represented by the straight line $D_1$, the transmission ratio of the differential gear is selected so that the rate at which fuel is taken by the regulator device is greater than the rate needed to feed the combustion chamber of the engine regardless of the speed of rotation of the motor (straight line $D_1$ can be seen to pass "above" the point $P_{T/O}$ of the curve C).

In this first element, the electric motor/generator of the regulator device thus operates continuously as an electricity generator transforming the mechanical energy received by the differential gear into electrical energy that is transmitted to the electric circuit of the airplane.

This first embodiment that requires a high power motor/generator presents the advantage of not being essential in flight if an emergency recirculation loop is provided (not shown in FIG. 1). It also makes it possible to generate electrical power that is useful for driving other pieces of equipment in the airplane. In contrast, the amount of mechanical energy taken from the engine shaft driving the pump is hardly any less than it would be with a device that did not include a differential.

In the example represented by the line $D_2$, the transmission ratio of the differential gear has been selected so that the rate at which fuel is taken by the regulator device (when $N_E=0$) is below the rate required for climbing and takeoff stages of the airplane (points on the curve C lying between $P_{T/O}$ and $P_C$) and also below the rate needed when lighting the combustion chamber of the engine (point $P_R$). During these stages, the electric motor/generator of the regulator device thus acts as an electric motor transforming electrical energy received from the electric circuit of the airplane into mechanical energy that is transmitted to the differential gear so as to drive the gear pump at a speed that is sufficient for feeding fuel properly to the combustion chamber. During all other stages of flight, the rate at which fuel is taken is greater than the rate needed for feeding the combustion chamber of the engine such that the motor/generator of the regulator device operates as an electricity generator.

Compared with the first example, this second example presents the advantage of not using or limiting use of the electric motor/generator during stages of cruising flight since the transmission ratio of the differential is selected so that the speed of rotation of the AGB then suffices to provide the cruising flow rate. Nevertheless, this example requires a high power electric motor/generator to be used, in particular to enable the airplane to take off.

The fuel flow rate represented by the straight line $D_3$ is a compromise between the two preceding examples. In this example, the transmission ratio of the differential gear is selected to that the electric motor/generator of the regulator device operates as an electric motor that supplies power while the airplane is taking off and during a portion of its climbing stage, and that acts as an electric generator during other flight stages.

This third example provides a good compromise between the "taken" power and the "generated" power. In particular, it presents the advantages of requiring an electric motor that is less powerful, of reducing the amount of mechanical energy that is taken from the engine shaft that drives the pump, and while in cruising flight of generating electrical power that is of use in driving other pieces of equipment of the airplane.

What is claimed is:

1. A device for regulating the flow rate of fuel taken from a fuel circuit of an aircraft propelled by an engine, the device comprising:
   a rotary positive displacement pump receiving fuel from a fuel circuit of the aircraft and delivering fuel at a rate that is proportional to its speed of rotation;
   an electric motor/generator of adjustable speed of rotation;
   an epicyclic gear train having a predefined transmission ratio, a first inlet mechanically coupled to the engine of the aircraft, a second inlet mechanically coupled to the electric motor/generator, and an outlet mechanically coupled to the rotary positive displacement pump for driving it in rotation, the transmission ratio of the epicyclic gear train being predefined as a function of the speed of rotation of the aircraft engine, of the speed of rotation of the engine motor/generator, and of the speed of rotation of the rotary positive displacement pump; and
   an electronic control system for regulating the speed of rotation of the electric motor/generator so as to regulate the speed of rotation of the rotary positive displacement pump as a function of a setpoint value for the flow rate of fuel to be injected.

2. A device according to claim 1, wherein the electronic control system includes means for calculating a setpoint value for the speed of rotation of the electric motor/generator from: the setpoint value for the flow rate of fuel to be injected; a real speed of rotation of the aircraft engine; a real speed of rotation of the electric motor/generator; and the transmission ratio of the epicyclic gear train.

3. A device according to claim 2, wherein the electronic control system is connected to a device for measuring the speed of rotation of the aircraft engine.

4. A device according to claim 2, wherein the electronic control system is connected to a device for measuring the speed of rotation of the electric motor/generator.

5. A device according to claim 2, wherein the setpoint value for the speed of rotation of the electric motor/generator is also calculated from a real flow rate of fuel delivered at the outlet from the rotary positive displacement pump.

6. A device according to claim 5, wherein the electronic control system is connected to a device for measuring the flow rate of fuel delivered at the outlet from the rotary positive displacement pump.

7. A device according to claim 1, wherein the setpoint value for the flow rate of fuel for injection is established on the basis of operating parameters of the aircraft and of the engine that propels it.

8. A device according to claim 1, further including a centrifugal pump having a low-pressure inlet receiving the fuel from the aircraft fuel circuit and a high-pressure outlet connected to the inlet of the rotary positive displacement pump.

9. A device according to claim 8, wherein the centrifugal pump is driven by mechanical coupling to the rotary positive displacement pump.

10. A device according to claim 8, wherein the centrifugal pump is driven by direct mechanical coupling to the aircraft engine.

11. A device according to claim 1, wherein the first inlet of the epicyclic gear train is mechanically coupled to an accessory gearbox of the aircraft engine.

12. A device according to claim 1, wherein the electric motor/generator is connected to at least one electric circuit of the aircraft via at least one electric inverter.

13. A device according to claim 1, wherein the electronic control system is an electronic module of a full authority digital engine control system of the aircraft engine.

14. A device according to claim 1, wherein the first inlet of the epicyclic gear train has a sun gear, the second inlet of the epicyclic gear train has an outer ring gear, and the outlet of the epicyclic gear train has a planet carrier.

* * * * *